(12) United States Patent
Abgrall et al.

(10) Patent No.: US 7,887,286 B2
(45) Date of Patent: Feb. 15, 2011

(54) SECTOR OF A COMPRESSOR GUIDE VANES ASSEMBLY OR A SECTOR OF A TURBOMACHINE NOZZLE ASSEMBLY

(75) Inventors: Olivier Abgrall, Melun (FR); Laurent Gilles Dezouche, Le Coudray Montceau (FR); Francois Maurice Garcin, Paris (FR); Jean-Pierre Francois Lombard, Pamfou (FR)

(73) Assignee: Snecma, Paris (FR)

( * ) Notice: Subject to any disclaimer, the term of this patent is extended or adjusted under 35 U.S.C. 154(b) by 895 days.

(21) Appl. No.: 11/763,694

(22) Filed: Jun. 15, 2007

(65) Prior Publication Data

US 2007/0297900 A1     Dec. 27, 2007

(30) Foreign Application Priority Data

Jun. 23, 2006   (FR)  .................................... 0652626

(51) Int. Cl.
*F01D 5/26* (2006.01)
*F01D 25/04* (2006.01)

(52) U.S. Cl. .................... 415/119; 415/139; 415/208.2; 277/647; 277/650; 277/654

(58) Field of Classification Search ................. 415/119, 415/139, 191, 208.2, 211.2; 277/647, 650, 277/652–654
See application file for complete search history.

(56) References Cited

U.S. PATENT DOCUMENTS

| | | | | |
|---|---|---|---|---|
| 2,249,127 A | * | 7/1941 | Goetze | 277/653 |
| 3,728,041 A | * | 4/1973 | Bertelson | 415/189 |
| 3,975,114 A | * | 8/1976 | Kalkbrenner | 415/210.1 |
| 4,470,754 A | | 9/1984 | Manente, Jr. et al. | |
| 4,477,086 A | * | 10/1984 | Feder et al. | 277/632 |
| 4,537,024 A | * | 8/1985 | Grosjean | 60/791 |
| 5,125,796 A | * | 6/1992 | Cromer | 415/174.2 |
| 5,154,577 A | * | 10/1992 | Kellock et al. | 415/170.1 |
| 5,158,430 A | * | 10/1992 | Dixon et al. | 415/134 |
| 5,221,096 A | * | 6/1993 | Heldreth et al. | 277/630 |
| 5,248,240 A | | 9/1993 | Correia | |
| 5,387,082 A | * | 2/1995 | Matyscak | 415/209.2 |
| 5,624,227 A | * | 4/1997 | Farrell | 415/139 |
| 5,865,600 A | * | 2/1999 | Mori et al. | 416/198 A |
| 5,934,687 A | * | 8/1999 | Bagepalli et al. | 277/637 |
| 6,193,240 B1 | * | 2/2001 | Johnson et al. | 277/643 |

(Continued)

FOREIGN PATENT DOCUMENTS

EP     0 903 467 A2     3/1999

(Continued)

*Primary Examiner*—Edward Look
*Assistant Examiner*—Sean J Younger
(74) *Attorney, Agent, or Firm*—Oblon, Spivak, McClelland, Maier & Neustadt, L.L.P.

(57) ABSTRACT

A sector of a compressor guide vanes assembly or a sector of a turbomachine nozzle assembly. It comprises an inner ring sector (4), an outer ring sector (6) and a multitude of blades (8) connecting the inner ring sector (4) to the outer ring sector (6). The outer ring sector (6) or the inner ring sector (4) comprises radial cuts (10) situated between two consecutive blades (8) in such a way as to split them into the same number of elementary sectors as there are blades. Housings (14) are provided, secant to the radial cuts (10), damping inserts (16) being positioned in said housings.

18 Claims, 3 Drawing Sheets

U.S. PATENT DOCUMENTS

| | | | |
|---|---|---|---|
| 6,199,871 B1 * | 3/2001 | Lampes | 277/614 |
| 6,257,594 B1 * | 7/2001 | Halling et al. | 277/644 |
| 6,290,459 B1 * | 9/2001 | Correia | 415/139 |
| 6,343,912 B1 | 2/2002 | Manteiga et al. | |
| 6,425,738 B1 | 7/2002 | Shaw | |
| 6,431,825 B1 * | 8/2002 | McLean | 415/135 |
| 6,446,978 B1 * | 9/2002 | Halling et al. | 277/626 |
| 6,648,332 B1 * | 11/2003 | Burdgick | 277/303 |
| 6,733,234 B2 * | 5/2004 | Paprotna et al. | 415/138 |
| 6,883,807 B2 * | 4/2005 | Smed | 277/644 |
| 7,090,224 B2 * | 8/2006 | Iguchi et al. | 277/603 |
| 7,097,423 B2 * | 8/2006 | Burdgick | 415/173.7 |
| 7,101,147 B2 * | 9/2006 | Balsdon | 415/135 |
| 7,152,864 B2 * | 12/2006 | Amos et al. | 277/650 |
| 7,168,914 B2 * | 1/2007 | Shiozaki et al. | 415/115 |
| 7,261,514 B2 * | 8/2007 | London et al. | 415/134 |
| 7,334,800 B2 * | 2/2008 | Minnich | 277/644 |
| 2004/0239053 A1 * | 12/2004 | Rowe et al. | 277/650 |

FOREIGN PATENT DOCUMENTS

| | | |
|---|---|---|
| EP | 1 408 199 A1 | 4/2004 |
| EP | 1 510 654 A1 | 3/2005 |
| FR | 1 330 656 | 6/1963 |

\* cited by examiner

SECTOR OF A COMPRESSOR GUIDE VANES ASSEMBLY OR A SECTOR OF A TURBOMACHINE NOZZLE ASSEMBLY

BACKGROUND OF THE INVENTION

The present invention relates to a sector of a compressor guide vanes assembly or a sector of a turbomachine nozzle assembly comprising an inner ring sector, an outer ring sector and a multitude of blades connecting the inner ring sector to the outer ring sector, the outer ring sector or the inner ring sector comprising radial cuts which may be oblique or otherwise, situated between two consecutive blades in such a way as to split them into the same number of elementary sectors as there are blades.

Turbomachines generally comprise, in series, a low-pressure compressor, a high-pressure compressor, a combustion chamber, a high-pressure turbine and a low-pressure turbine.

The compressors and the turbines comprise several rows of circumferentially spaced moving vanes separated by rows of fixed vanes. In modern turbomachines, the guide vanes assemblies and the nozzle assemblies are subjected to high dynamic stresses. This is because technological advances have led to a reduction in the number of stages for the same or better performance, and this results in a higher load on each stage. Furthermore, advances in production technologies have led to a reduction in the number of parts which has led to a reduction in the damping effect of the connections between the parts. This is particularly the case when use is made of a technology that involves brazing in place the supply of abradable material which eliminates a significant potential for dissipating vibrational energy.

DESCRIPTION OF THE PRIOR ART

A collection of stator vanes comprising an outer annular structure, an inner annular structure and a set of individual vanes connecting the outer structure and the inner structure is known (from U.S. Pat. No. 6,343,912). The vanes have inner and outer platforms which respectively form an outer flow surface and an inner flow surface. A set of inner bands and a set of outer bands close the gaps between the platforms. The bands are fixed in place using an appropriate adhesive, such as a compound that can be vulcanized at ambient temperature.

However, in this assembly, the vanes are individual rather than formed as one piece with the inner ring and the outer ring, and this constitutes a disadvantage from the manufacturing point of view because it increases the number of parts that have to be assembled.

SUMMARY OF THE INVENTION

A subject of the present invention is a sector of guide vanes assembly and a sector of nozzle assembly which overcome these disadvantages.

These objects are achieved according to the invention through the fact that housings are provided, secant to the radial cuts, damping inserts being positioned in said housings and through the fact that the inserts consist of at least one viscoelastic layer, each viscoelastic layer being sandwiched between two metal layers.

In one embodiment the damping inserts are fitted into the housings such that they are free. In another embodiment, the damping inserts are fitted into the housings such that they are preloaded.

Advantageously, the housings are perpendicular to the radial cuts. The damping inserts may have varying geometries, for example H-shaped, X-shaped, hairpin-shaped, wavy, U-shaped, Z-shaped or S-shaped geometries.

BRIEF DESCRIPTION OF THE DRAWINGS

Other features and advantages of the invention will become further apparent from reading the description which follows of some exemplary embodiments which are given by way of illustration with reference to the attached figures. In these figures.

DESCRIPTION OF THE PREFERRED EMBODIMENTS

Figure 1:
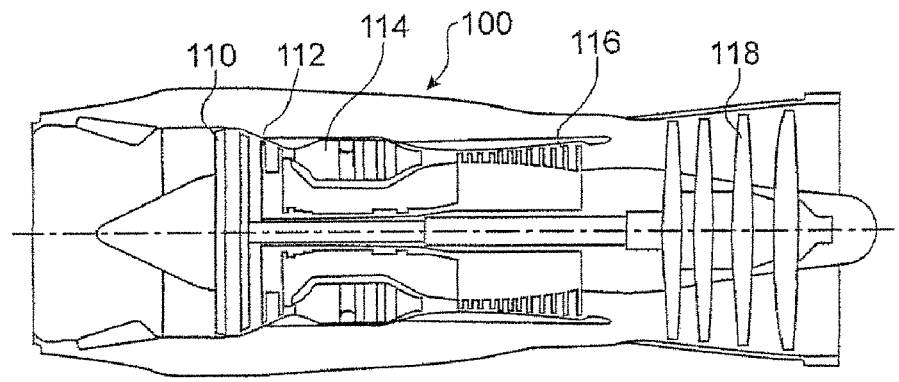
FIG. 1 is a view in section of a turbine engine.

FIG. 1 depicts an aeroengine 100 to which the invention may apply. It comprises, from the upstream end downstream, a low-pressure compressor 110, a high-pressure compressor 112, an annular combustion chamber 114, a high-pressure turbine 116 and a low-pressure turbine 118.

Figure 2:
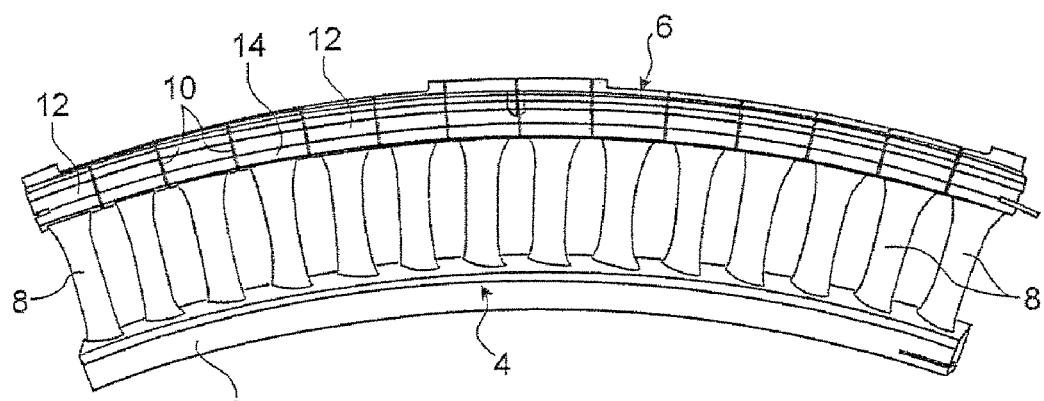
FIG. 2 is an overall view of a sector of a compressor guide vane assembly according to the present invention.

FIG. 2 depicts a view of a sector of compressor guide vanes assembly. In order to reduce the number of parts, this sector is cast in one piece. It comprises an inner ring sector 4, an outer ring sector 6 and blades 8 connecting the inner ring sector 4 to the outer ring sector 6. A layer of abradable material 9, which may be viscoelastic or abrasive according to the type of guide vanes assembly is secured to the inner ring 4. The inner ring sector 4 is made as one piece while the outer ring sector 6 comprises radial cuts 10 situated between two consecutive blades so as to split it into as many elementary sectors 12 as there are blades. The cuts 10 are machined, for example, by edm, once the part has been produced in one piece. They form a gap approximately 1 mm wide situated more or less on a mid-line between two blades. Thereafter, a second machining operation is performed using the same method but in a direction perpendicular to the gaps 10 so as to form a housing 14 consisting of two half-parts. In the example depicted, the housing 14 lies perpendicular to the radial cuts 10. However, this feature is not essential and the housings could be non-perpendicular to the radial cuts 10.

Figure 3:
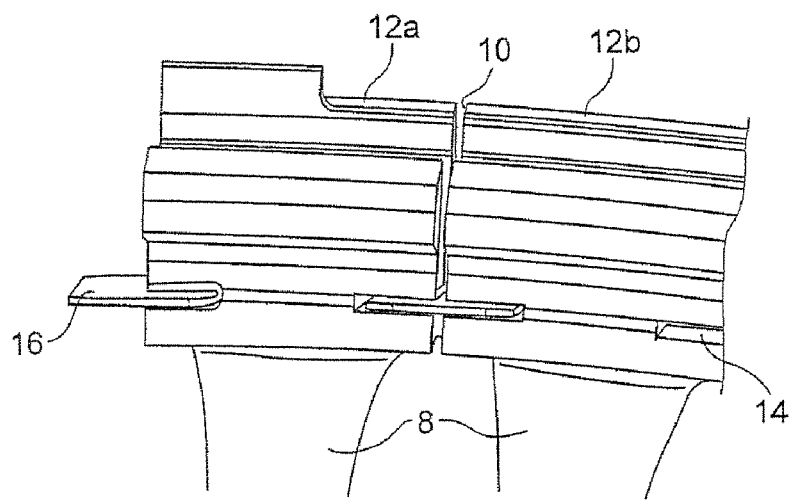
FIG. 3 is a detailed perspective view of the sector of FIG. 2.

FIG. 3 depicts a detailed view on a larger scale of the gaps 10 and of the housings 14. A thin metal insert 16 is introduced into each housing. Each insert 16 has two friction surfaces: one rubbing against the elementary sector 12a and the other rubbing against the elementary sector 12b. Thus, when the blades 8 vibrate, the movements of each sector cause a forced sliding movement between themselves and the insert at the friction surfaces. Through the effect of the pressure gradient between the aerodynamic stream and the outside, the insert is pressed firmly against the friction surfaces with a normal force resulting from this pressure gradient.

Figure 4:
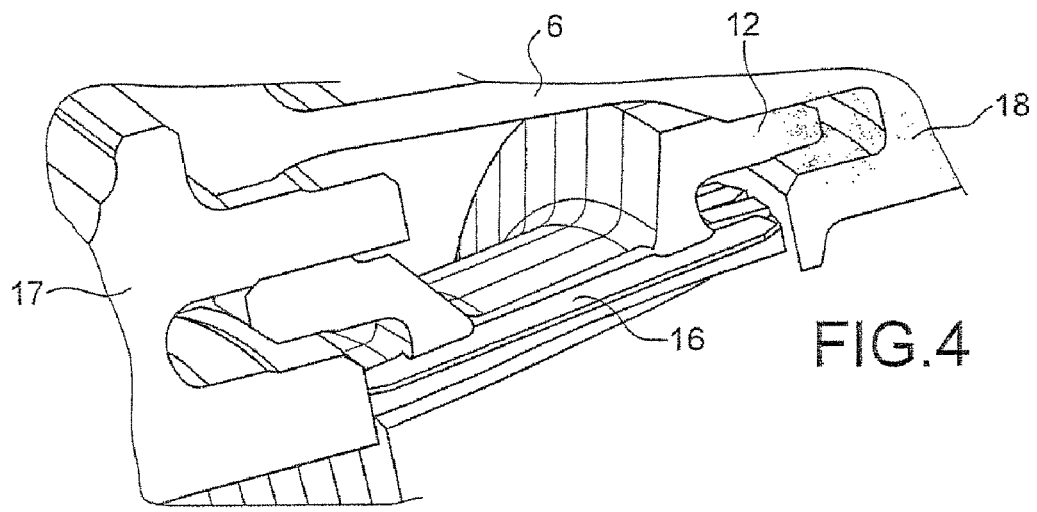
FIG. 4 is another detailed perspective view of the sector of FIG. 2 showing the insert axial retention system.

FIG. 4 depicts a perspective view of the outer ring 6 of the sector of FIG. 1. This view shows a system for the axial retention of the inserts 16. Each insert 16 is sandwiched between the turbomachine casing sub-parts 17 and 18 in such a way that it is axially immobilized.

Figure 5:
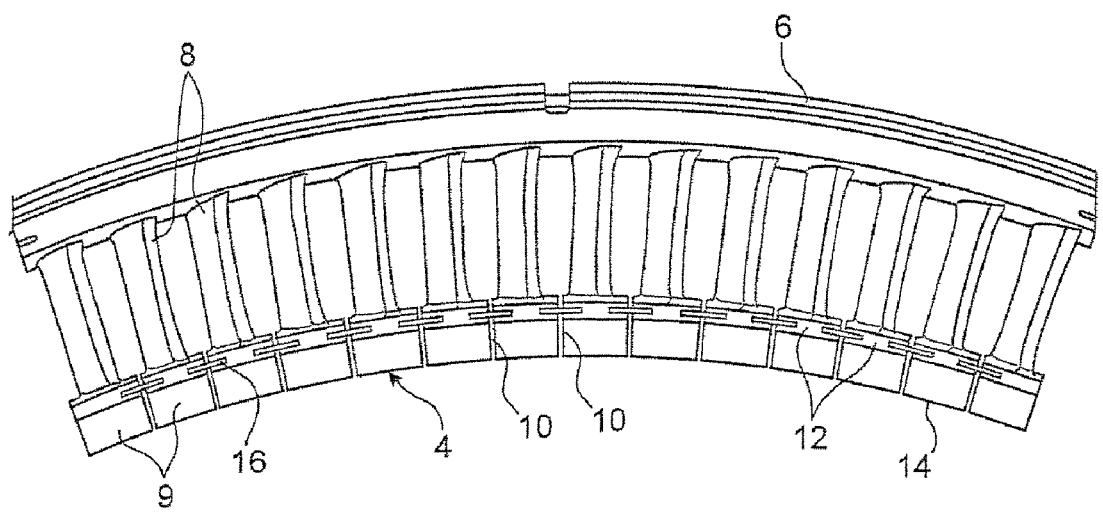
FIG. 5 is a general view of an alternative form of embodiment of a sector according to the present invention.

FIG. 5 depicts a general view of an alternative form of embodiment of a sector for a compressor guide vanes assembly according to the present invention. In this alternative form, the outer ring sector 6 is made as a single piece while the inner ring sector 4 has radial cuts 10 situated between two consecutive blades 8 in such a way as to divide it into as many elementary sectors 12 as there are blades. The layer 9 of abradable material, which may be viscoelastic or abrasive, is also cut into elementary sectors by the radial cuts 10. Housings 14 are provided, secant to the radial cuts 10. Damping inserts 16 are positioned in the housings 14.

Figure 6:
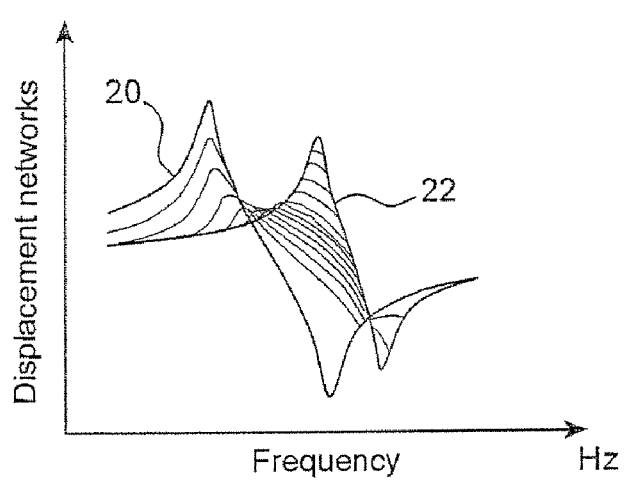
FIG. 6 is a graph illustrating the dynamic response of the system.

FIG. 6 depicts a graph illustrating the dynamic response of the system. The reference 20 represents the response of the system without damping inserts while the reference numeral 22 denotes the response of the system with the inserts stuck in place. During operation the system passes through an infinite number of unstable states ranging between the curves 20 and 22 and corresponding to successive states in which the insert is stuck in place or in which it slides with respect to the surface of the housings. Thus, a nonlinear stiffness is obtained which is dependent on the amplitude of the vibrations. When the amplitude of the vibrations increases, the insert detaches. When the amplitude of the vibrations decreases, the insert is stuck to the surface of the housings under the effect of the pressure difference across these two faces.

The operating principle relies on the introduction of a stiffness nonlinearity into the dynamic behavior of the structure. This nonlinearity is activated from a threshold level of vibration of the system as a whole. This vibrational activity causes relative motion between the elementary sectors of the blades and the damping insert. This relative motion gives rise to losses in adhesion and to successive reattachments of the damping inserts. These result in continuous variation of the local stiffness of the system. As a result, the mode or modes responsible for vibrational activity are thrown into disarray by the constant variation in their associated natural frequencies. System resonance cannot become established because of the continuous variation in the state of the dynamic system. This then results in a very substantial reduction in system levels of vibration.

Figure 7:
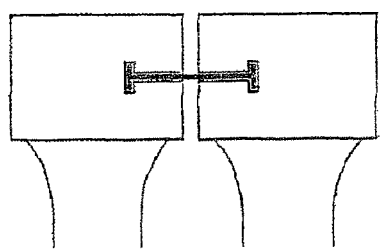
FIGS. 7 to 14 are figures illustrating various insert geometries.
Figure 8:
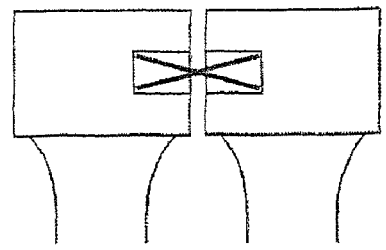
Figure 9:
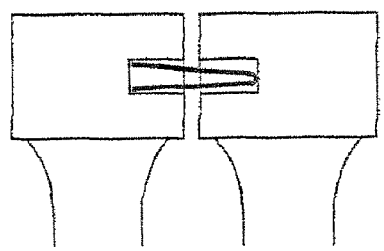
Figure 10:
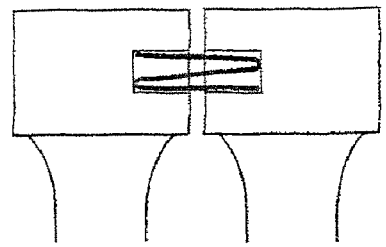
Figure 11:
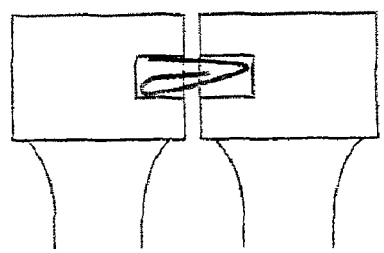
Figure 12:
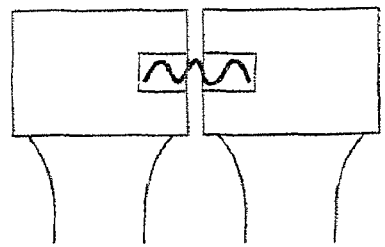
Figure 13:
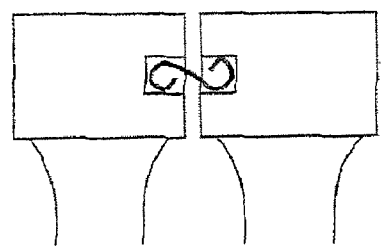
Figure 14:
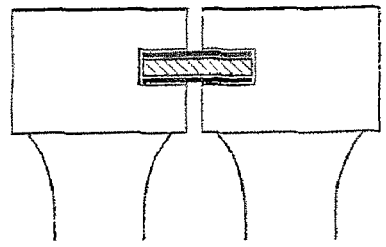

FIGS. 7 to 14 depict various alternative forms of embodiment of the geometry of the damping inserts. In FIG. 7, the inserts have an H-shaped geometry; in FIG. 8, the inserts have an X-shaped geometry. In FIG. 9, the damping inserts have a U-shaped geometry and are preloaded. In other words, the inserts 16 have elasticity which presses them firmly against the surface of the housing. FIG. 10 depicts a damping insert having a Z-shaped geometry and also preloaded, and FIG. 11 depicts an insert with a hair-pin shaped geometry, again preloaded. FIG. 12 depicts an insert with a wavy geometry and preloaded and FIG. 13 depicts an insert having an S-shaped geometry and again preloaded. FIG. 14 depicts a metal-viscoelastic-metal sandwich insert. This consists of two sheets of a hard material 20 between which a layer of a viscoelastic material is positioned. Of course, instead of having a single layer of elastic material, it would be possible to have several, each layer of viscoelastic material being sandwiched between two layers of hard material. Finally, it must be understood that the damping inserts that have an X-shaped, U-shaped, Z-shaped, hair-pin shaped, wavy or S-shaped geometry may themselves consist of one or more layers of viscoelastic material sandwiched between two layers of hard material.

The invention claimed is:

1. A sector of a compressor guide vanes assembly or a sector of a turbomachine nozzle assembly, comprising:
    an inner ring sector;
    an outer ring sector; and
    a multitude of blades connecting the inner ring sector to the outer ring sector,
    wherein at least one of the outer ring sector and the inner ring sector includes radial cuts between consecutive blades such that there are a same number of elementary sectors as there are blades,
    wherein housings are disposed secant to the radial cuts, and
    wherein damping inserts are positioned in said housings, the inserts including at least one viscoelastic layer, each viscoelastic layer being sandwiched between two metal layers.

2. The sector as claimed in claim 1, wherein the damping inserts are fitted into said housings such that the damping inserts are free.

3. The sector as claimed in claim 1, wherein the damping inserts are fitted into said housings such that the damping inserts are preloaded.

4. The sector as claimed in claim 1, wherein the housings are perpendicular to the radial cuts.

5. The sector as claimed in claim 2, wherein the damping inserts have an H-shaped geometry.

6. The sector as claimed in claim 2, wherein the inserts have an X-shaped geometry.

7. The sector as claimed in claim 3, wherein the damping inserts have a hairpin-shaped geometry.

8. The sector as claimed in claim 3, wherein the damping inserts have a wavy geometry.

9. The sector as claimed in claim 3, wherein the damping inserts have a U-shaped geometry.

10. The sector as claimed in claim 3, wherein the damping inserts have a Z-shaped geometry.

11. The sector as claimed in claim 3, wherein the damping inserts have an S-shaped geometry.

12. A turbomachine compressor comprising:
    at least one sector as claimed in claim 1.

13. A turbomachine turbine comprising:
    at least one sector as claimed in claim 1.

14. A turbomachine comprising:
    a compressor as claimed in claim 12.

15. The sector as claimed in claim 2, wherein the housings are perpendicular to the radial cuts.

16. The sector as claimed in claim 3, wherein the housings are perpendicular to the radial cuts.

17. A turbomachine comprising:
    a turbine as claimed in claim 13.

18. The sector as claimed in claim 1, wherein the damping inserts are axially immobilized.

* * * * *